United States Patent
Mau et al.

(10) Patent No.: US 7,527,239 B2
(45) Date of Patent: May 5, 2009

(54) CONTROL VALVE ASSEMBLY FOR SPRAY GUNS

(75) Inventors: Tsuo Fei Mau, Changhua Hsien (TW); Yi Cheng Liu, Changhua (TW); Tung Yang Yu, Changhua Hsien (TW)

(73) Assignee: Ruey Ryh Enterprise Co., Ltd, Changhua Hsien (TW)

( * ) Notice: Subject to any disclaimer, the term of this patent is extended or adjusted under 35 U.S.C. 154(b) by 543 days.

(21) Appl. No.: 11/373,968

(22) Filed: Mar. 14, 2006

(65) Prior Publication Data

US 2007/0215829 A1  Sep. 20, 2007

(51) Int. Cl.
*F16K 47/00* (2006.01)
*B05B 7/02* (2006.01)

(52) U.S. Cl. .................. 251/121; 239/596; 239/526; 239/570; 251/331

(58) Field of Classification Search ............. 239/596, 239/526, 570, 574, 525, 569, 583, 586; 251/121, 251/331, 45, 186, 319, 176, 120, 118, 40; 137/882, 846, 849, 844, 843, 244
See application file for complete search history.

(56) References Cited

U.S. PATENT DOCUMENTS

| | | | | |
|---|---|---|---|---|
| 3,763,881 A * | 10/1973 | Jones | .......... | 137/414 |
| 5,456,448 A * | 10/1995 | Chou | .......... | 251/230 |
| 5,984,207 A * | 11/1999 | Wang | .......... | 239/526 |
| 6,131,608 A * | 10/2000 | Lu | .......... | 137/550 |
| 6,352,212 B1 * | 3/2002 | Wang | .......... | 239/390 |
| 6,390,390 B1 * | 5/2002 | Hung | .......... | 239/525 |
| 6,641,062 B1 * | 11/2003 | Chen | .......... | 239/526 |
| 6,659,373 B1 * | 12/2003 | Heren et al. | .......... | 239/570 |
| 6,685,110 B2 * | 2/2004 | Wang | .......... | 239/526 |
| 6,691,937 B2 * | 2/2004 | Heren et al. | .......... | 239/570 |
| 6,702,206 B2 * | 3/2004 | Wu | .......... | 239/526 |
| 6,796,515 B2 * | 9/2004 | Heren et al. | .......... | 239/526 |
| 7,201,332 B2 * | 4/2007 | Wang et al. | .......... | 239/526 |
| 7,296,780 B1 * | 11/2007 | Hung | .......... | 251/121 |
| 2003/0189111 A1 * | 10/2003 | Heren et al. | .......... | 239/570 |
| 2004/0135013 A1 * | 7/2004 | Heren et al. | .......... | 239/570 |
| 2005/0001070 A1 * | 1/2005 | Wu | .......... | 239/526 |
| 2005/0121476 A1 * | 6/2005 | Pauls et al. | .......... | 222/402.24 |
| 2006/0273205 A1 * | 12/2006 | Wang et al. | .......... | 239/526 |
| 2007/0194148 A1 * | 8/2007 | Rosko et al. | .......... | 239/526 |
| 2008/0011365 A1 * | 1/2008 | Newton et al. | .......... | 137/540 |

* cited by examiner

*Primary Examiner*—Len Tran
*Assistant Examiner*—Daniel T Sharpe
(74) *Attorney, Agent, or Firm*—Senninger Powers LLP

(57) ABSTRACT

A control valve assembly for spray guns comprises a flexible valve having a water-sealing portion defined by a support surface and an abutment surface conjoined to a pivoting rod via a water-stop surface disposed there-between. A water-pressure adjusting valve includes a pressure-relief section having a flow orifice to mount to a valve shaft of a pressure valve and match to the pivoting rod and the abutment surface of the flexible valve thereby. The pressure-relief section, precisely situated between a stop seat of a spray gun body and a valve seat, has a watertight ring fixed at one side to closely abut against the stop seat. A support section, extending at the other side of the water-pressure adjusting valve, has a pivoting hole defining the end portion opposite to the flow orifice thereof. Besides, the pressure valve has a positioning ring mounted to the predetermined position of the valve shaft thereon.

7 Claims, 3 Drawing Sheets

CONTROL VALVE ASSEMBLY FOR SPRAY GUNS

BACKGROUND OF THE INVENTION

The present invention relates to a control valve assembly for spray guns wherein a water-pressure adjusting valve is situated between a stop seat of a valve chamber and a top-support portion of a valve seat so as to buffer the water pressure generated at the instant of water discharge and maintain the balance of water pressure within the valve chamber thereof; besides, a flexible valve is equipped with a support surface and a pivoting rod respectively squeezed and abutted tight by a guide-and-push surface and a positioning ring of a pressure valve so that a control button can precisely control the discharge or shutoff of water supply, facilitating more smooth and accurate operation thereby.

A conventional spray gun (as shown in the attached document) is disclosed in the Taiwan Patent titled "Spray Gun Control Valve Assembly Structure" filed on Jun. 27, 2005 with an application No. 94210790 and granted for publication on Dec. 1, 2005 by No. M 281720. However, this prior art contains some disadvantages. Most of all, when a control button 25 of a spray gun body 20 is pushed downwards, water supply will immediately flow from a first aperture 211 to pass through a port 37 of an end cover 30 and water intake spaces 743 of a collar 74 for discharge in an instant. Meanwhile, a water-sealing portion 72 of a flexible valve 70 has already detached from the close abutment of a push guiding surface 53 of a pressure valve, and water pressure generated in the moment of water discharge tends to squeeze at the water-sealing portion 72 of the flexible valve 70 and deform it thereby. Besides, the pressure generated instantly by the water discharge can overpower the elastic force of a spring 36 and hinder the operation of a valve sleeve 40 and the pressure valve in return back to the state of water shutoff. Therefore, the control button 25 becomes hard to push and fails to provide an accurate control of water discharge or shutoff in operation thereof.

SUMMARY OF THE PRESENT INVENTION

It is, therefore, the primary purpose of the present invention to provide a control valve assembly for spray guns wherein a flexible valve is equipped with a support surface and a pivoting rod that are respectively squeezed and abutted tight by a guide-and-push surface and a positioning ring of a pressure valve so that a control button can precisely control the discharge or shutoff of water supply, achieving the best state of application thereby.

It is, therefore, the second purpose of the present invention to provide a control valve assembly for spray guns wherein a water-pressure adjusting valve is situated between a stop seat of a valve chamber and protrusive blocks extending at a top-support portion of a valve seat so that the water-pressure adjusting valve can buffer the water pressure generated at the instant of water discharge via a pressure-relief section and guide the water current via a flow orifice, efficiently maintaining the balance of water pressure within the spray gun body therein and facilitating smoother discharge of the water flow thereby.

It is, therefore, the third purpose of the present invention to provide a control valve assembly for spray guns wherein an actuating valve has an insert hole coupled with a positioning stem and a protruding flange of the pressure valve, and guiding blocks of the pressure valve and the actuating valve thereof are respectively matched and restricted by stop portions and retaining portions defining a pivoting chamber of the valve seat thereon so that the control button can be easily pushed for water discharge without a user continuously pressing onto it, achieving accurate and convenient operation of the present invention thereby.

DETAILED DESCRIPTION OF THE PREFERRED EMBODIMENTS

Figure 1:
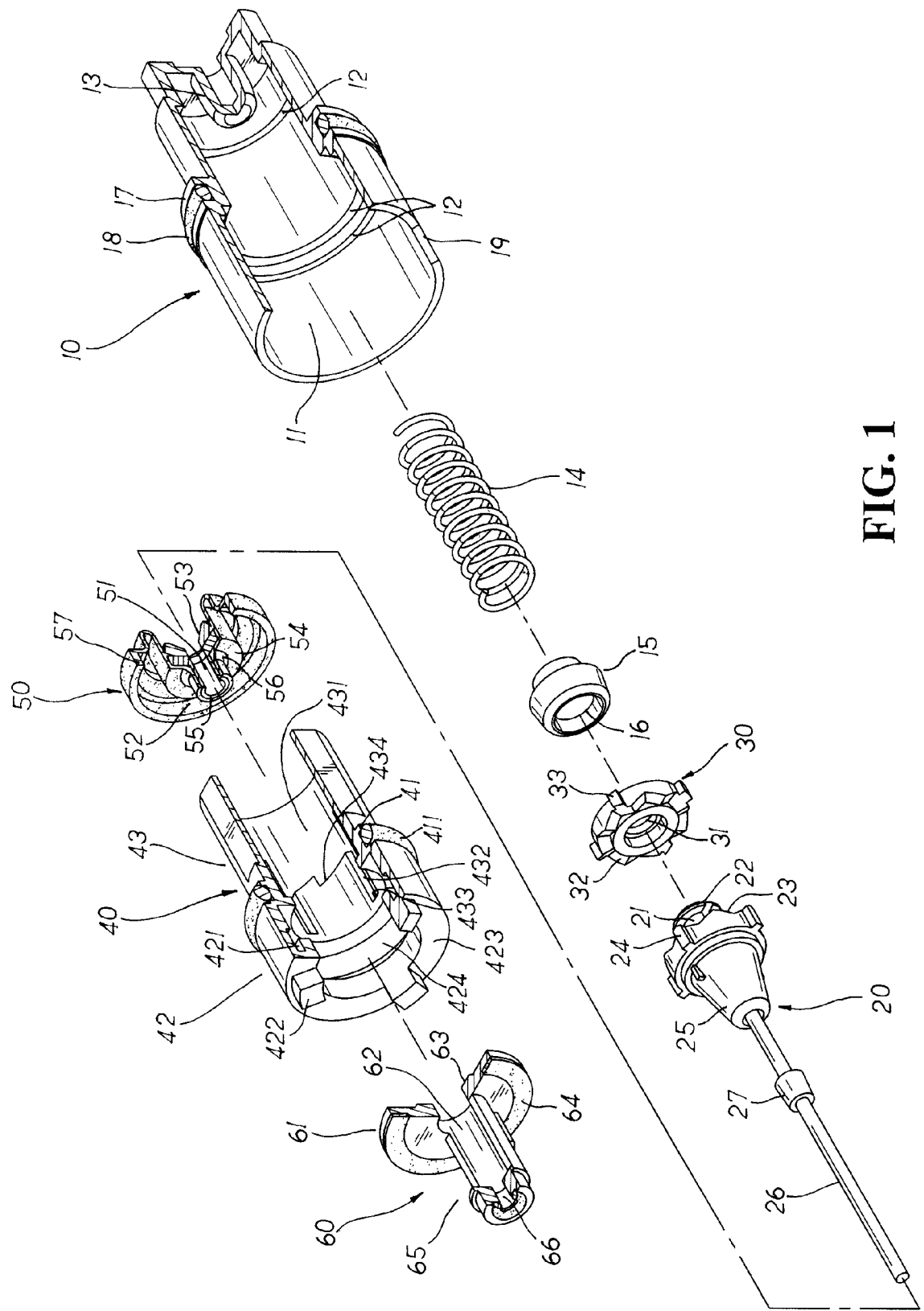
FIG. 1 is an exploded perspective view of the present invention.

Please refer to FIG. 1 showing an exploded perspective view of the present invention. The present invention relates to a control valve assembly for spray guns, comprising an end cover 10, a pressure valve 20, an actuating valve 30, a valve seat 40, a flexible valve 50, and a water-pressure adjusting valve 60. The end cover 10 has an accommodating cavity 11 defining the interior therein and a plurality of stepwise restricting rings 12 extending at the middle and bottom sections of the accommodating cavity 11 thereon. A protrusive post 13 is provided extending at the bottom of the accommodating cavity 11 thereon to reciprocally match to a spring 14 and a stepwise collar member 15 having a limiting groove 16 indented at one side thereon. The end cover 10 also has a recess 17 with a water-sealing hoop 18 accommodated therein disposed at the predetermined position of the outer circumferential surface thereon, and a water-intake port 19 appropriately cut at the opening end of the accommodating cavity 11 thereon. The pressure valve 20 has a positioning stem 21 with a protruding flange 22 extending in the middle of one side thereon, and the actuating valve 30 is equipped with an insert hole 31 extending through the center thereof. Both adjacent sides of the pressure valve 20 and the actuating valve 30 are respectively provided with tooth-facets 23, 32 corresponding to each other. Besides, the pressure valve 20 and the actuating valve 30 are respectively equipped with a plurality of guide blocks 24, 33 spaced at the circumferential surfaces thereon. The pressure valve 20 also includes a conically tapered guide-and-push surface 25 disposed at one end thereon, and a valve shaft 26 having a positioning ring 27 extending thereon is provided protruding from the center of the guide-and-push surface 25. The valve seat 40 has a fixing groove 41 with a waterproof hoop 411 accommodated therein disposed in the middle section of the outer surface thereon, and a top-support portion 42 with a U-shaped insert groove 421 defining the inner wall thereon is disposed at one end of the valve seat 40 thereof. Multiple protrusive blocks 422 are provided protruding at the end edge of the top-support portion 42 thereon to form a plurality of water inlet spaces 423 among the protrusive blocks 422 thereby, and an opening 424 is disposed in the center of the top-support portion 42 thereof. The other end of the valve seat 40 is equipped with an appropriate-extending operational portion 43 having a pivoting chamber 431 defining therein, and a plurality of guiding recesses 432 each having a stop portion 433 defining one end are annularly arranged at the pivoting chamber 431 thereon. And oblique stepwise retaining portions 434 are provided slanting sideways from the protrusive surface between the guiding recesses 432 thereof. The flexible valve 50 has a through hole 51 extending through the center thereof, and a water-sealing portion 52 protruding in the center of the through hole 51. The flexible valve 50 is also equipped with a conically tapered support surface 53 indented at one end side thereon, and an abutment surface 54 with a pivoting rod 55 extending at the other end side thereof. The abutment surface 54 and the pivoting rod 55 thereof are conjoined by an oblique water-stop surface 56 at the adjacent section thereon, and defined by an insert rib 57 extending perpendicularly in a circle at the outer circumference thereon. A plate-like pressure-relief section 61 defined by a flow orifice 62 is disposed at one side of the water-pressure adjusting valve 60. The pressure-relief section 61 thereof has a stop flange 63 protruding at one end surface thereon, and a watertight ring 64 fixed at the other end surface thereon. A support section 65 is provided protruding from the circumferential edge of the flow orifice 62 thereof with a pivoting hole 66 disposed at the end portion in opposite to the flow orifice 62 thereof.

Figure 2:
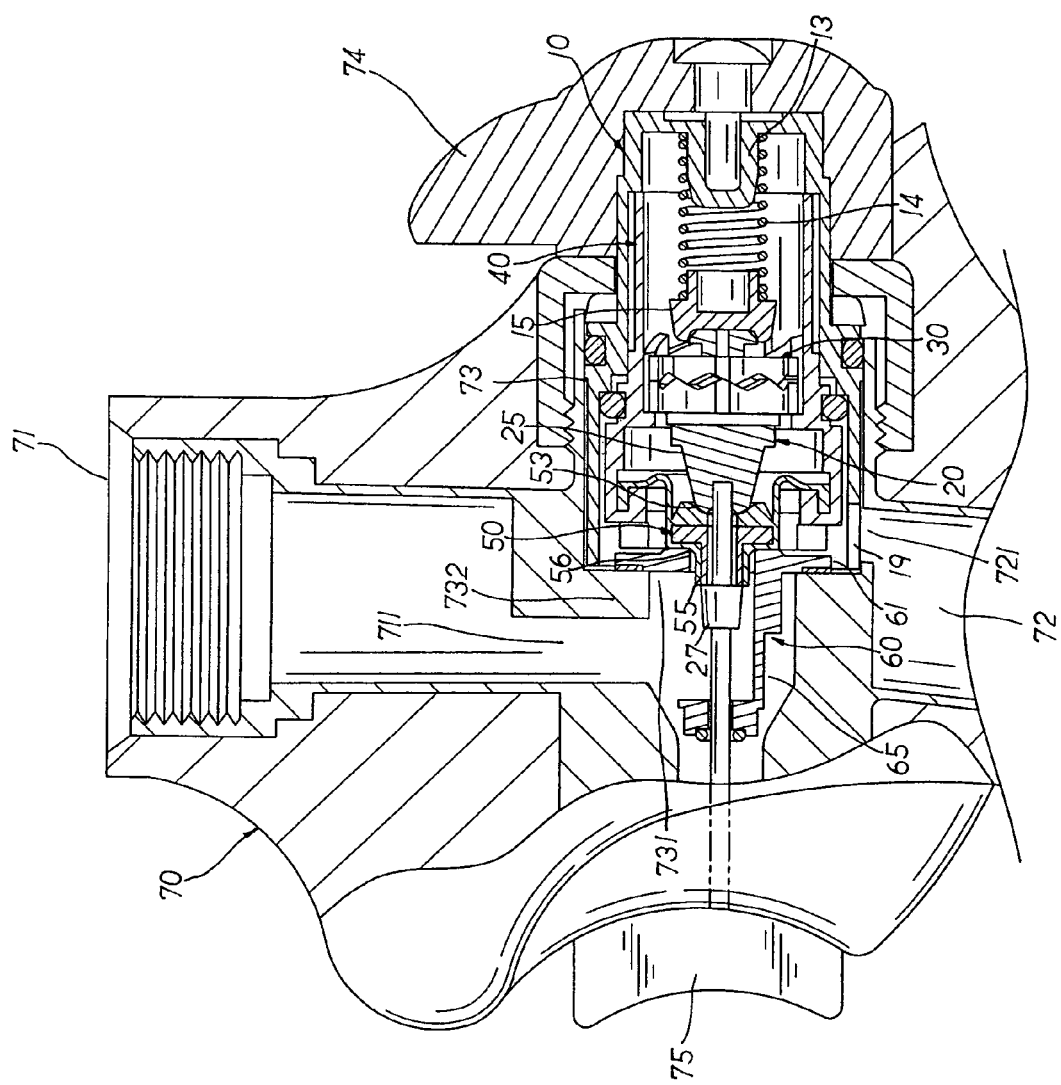
FIG. 2 is a fragmentary cross sectional view of the present invention mounted to a spray gun in a state of water shutoff.

In assembly (referring to FIG. 2), the spring 14 and the collar member 15 are sequentially mounted into the accommodating cavity 11 of the end cover 10 and engaged with the protrusive post 13 thereof, and the insert rib 57 of the flexible valve 50 is reciprocally registered with the insert groove 421 of the valve seat 40. Then, the insert hole 31 of the actuating valve 30 is pivotally joined to the positioning stem 21 of the pressure valve 20 and movably engaged therewith via the protruding flange 22, permitting the tooth-facets 23, 32 thereof to correspond to each other thereby. The valve shaft 26 of the pressure valve 20 is guided through the through hole 51 of the flexible valve 50 till the positioning ring 27 thereof is located at one side, permitting the support surface 53 of the water-sealing portion 52 to abut against the guide-and-push surface 25 thereby. Then, the guiding blocks 24, 33 of the pressure valve 20 and the actuating valve 30 are correspondingly joined to the guiding recesses 432 defining the pivoting chamber 431 of the valve seat 40 thereon till restricted in movement by the stop portions 433 thereof, permitting the guide-and-push surface 25 to press against the water-sealing portion 52 of the flexible valve 50 and extend through the opening 424 of the top-support portion 42 thereby. The valve seat 40 is then mounted into the accommodating cavity 11 till the protruding flange 22 of the pressure valve 20 and one end side of the actuating valve 30 are respectively coupled with the limiting groove 16 of the collar member 15 and elastically supported by the spring 14 to abut against each other thereby, permitting the end portion of the valve seat 40 and the waterproof hoop 411 of the fixing groove 41, thereof to precisely contact and join with the restricting rings 12 of the end cover 10 thereby. Then, the flow orifice 62 and the pivoting hole 66 of the water-pressure adjusting valve 60 are respectively guided to mount to the valve shaft 26 of the pressure valve 20, permitting the positioning ring 27 to pivotally accommodate into the support section 65 extending between the flow orifice 62 and the pivoting hole 66 thereof. Thus, one lateral side of the pressure-relief section 61 thereof is allowed to abut against the protrusive blocks 422 of the top-support portion 42 to define the water inlet spaces 423 fluidly connected with the water-intake port 19 thereof, permitting the pivoting rod 55 of the water-sealing portion 52 to precisely situate at the flow orifice 62 therein. The support surface 53 of the water-sealing portion 52 will be flexibly squeezed by the pressure valve 20, the guide-and-push surface 25, and the spring 14, permitting the abutment surface 54 and the water-stop surface 56 to tightly abut against the flow orifice 62 and the stop flange 63 respectively, achieving the state of water shutoff thereby. In addition, the watertight ring 64 of the pressure-relief section 61 can be precisely abutted against a stop seat 732 of a valve chamber 73, and the valve shaft 26 is activated by the pushing operation of a control button 75. And the water-sealing hoop 18 accommodated into the recess 17 of the end cover 10 is accurately secured to abut tight against the opening edge of the valve chamber 73, permitting the water-intake port 19 of the end cover 10 to precisely match to a second aperture 721 of a water inlet duct 72 thereby. Thus, an adjusting cap 74 can be rotated to alter the position of the water-intake port 19 so as to control the amount of water discharge thereby.

Figure 3:
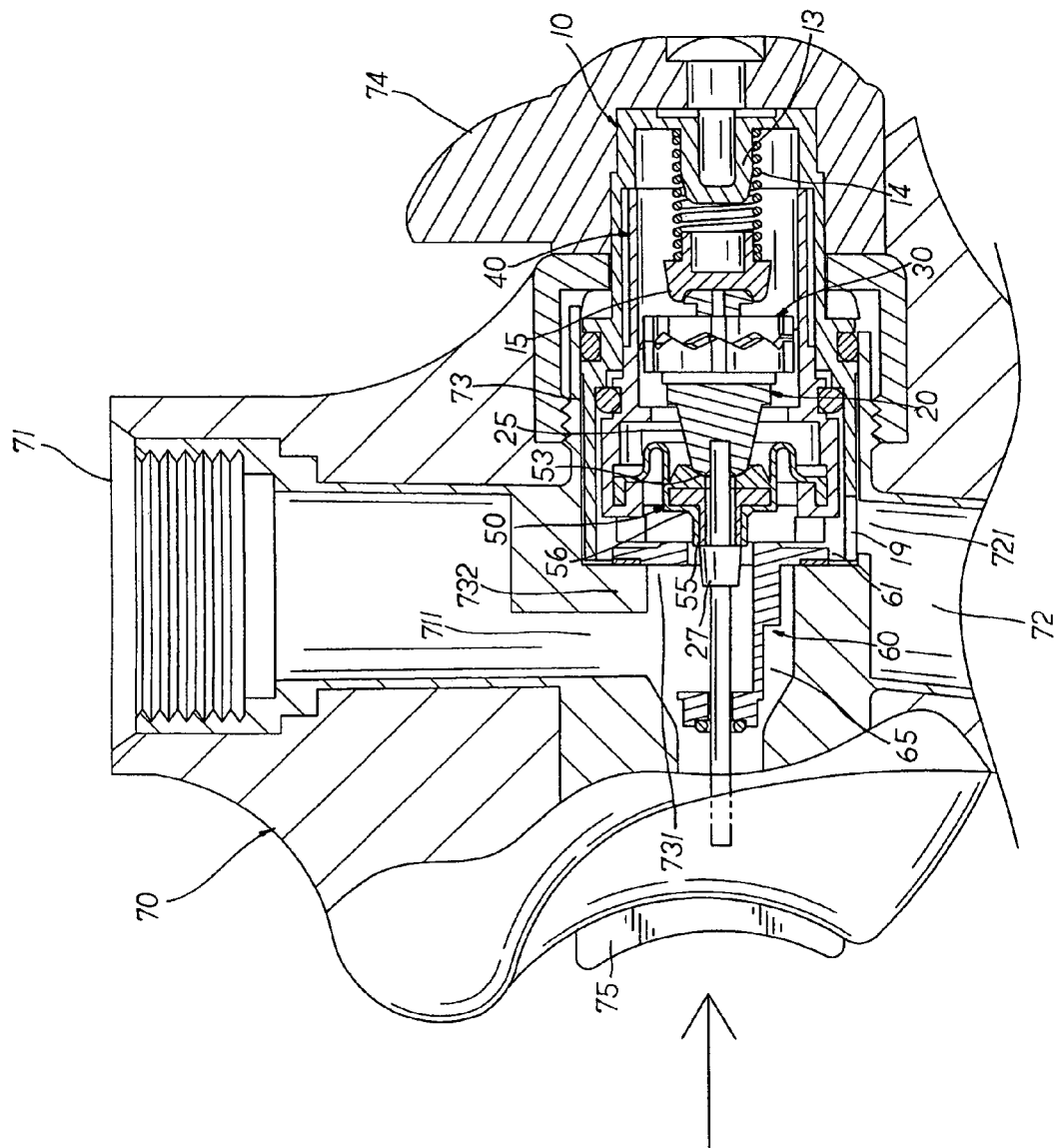
FIG. 3 is a diagram showing a pushing operation of the present invention in a state of water discharge.

In operation (referring to FIG. 3), the control button 75 is pushed to press downwards the valve shaft 26 and activate the guide blocks 24, 33 of the pressure valve 20 and the actuating valve 30 respectively sliding along the guiding recesses 432 of the pivoting chamber 431 thereof so as to compress the collar member 15 and the spring 14 thereby. When the guide blocks 33 of the actuating valve 30 are glided to locate onto the retaining portions 434 of the pivoting chamber 431 respectively, the support surface 53 of the water-sealing portion 52 is allowed to release from the squeezing force exerted thereto by the spring 14, the collar member 15, the actuating valve 30, and the pressure valve 20 and flexibly rebound inwards. Meanwhile, the positioning ring 27 of the valve shaft 26 is actuated to descend and push against the pivoting rod 55 of the water-sealing portion 52 thereof, permitting the abutment surface 54 and the water-stop surface 56 to detach from the stop flange 63 and the flow orifice 62 respectively so that a third aperture 731 can be fluidly connected with a second aperture 711 and the second aperture 721 for the discharge of water supply thereby. Therefore, water flow accommodated in the water inlet duct 72 can go sequentially from the second aperture 721 and the water-intake port 19 of the end cover 10, through the water inlet spaces 423 of the top-support portion 42 thereof and the flow orifice 62 of the water-pressure adjusting valve, to the third aperture 731 and then the first aperture 711 to enter a water outlet duct 71 for the discharge of water outwards there-from. When the water flow passes through the water inlet spaces 423 and contacts with the pressure-relief section 61 of the water-pressure adjusting valve 60, the pressure-relief section 61 thereof will buffer the strong current of the water flow so as to achieve the balance of water pressure within the interior of a spray gun body 70 thereby. Furthermore, the pivoting rod 55 of the water-sealing portion 52 is pushed and abutted by the positioning ring 27 so as to maintain the elastic extension of the flexible valve 50 thereby. When the valve shaft 26 is pressed again by the control button 75 thereof, the spring 14 will flexibly bounce the collar member 15, the actuating valve 30, and the pressure valve 20 back into positions respectively thereof. Meanwhile, the guide blocks 33 of the actuating valve 30 will be detached from the retaining portions 434 thereof and slid back into the guiding recesses 432 respectively. Then, the support surface 53 of the flexible valve 50 will be squeezed and abutted by the guide-and-push surface 25 again, permitting the abutment surface 54 and the water-stop surface 56 to re-contact watertight with the flow orifice 62 and the stop flange 63 thereof to shut off the discharge of water supply thereby. Therefore, via the support surface 53 and the pivoting rod 55 of the flexible valve 50 restricted and abutted tight by the guide-and-push surface 25 and the positioning ring 27 thereof, the control button 75 can easily activate the valve shaft 26 to control the discharge or shutoff of the water supply thereby, efficiently maintaining a smooth and accurate operation thereof. In addition, the water-pressure control valve 60 is sandwiched between the protrusive blocks 422 of the top-support portion 42 and the stop seat 732 of the valve chamber 73 so as to buffer the water pressure generated at the instant of water discharge and guide the water flow therein, efficiently maintaining the balance of water pressure therein to achieve the best controlled state thereby.

What is claimed is:

1. A control valve assembly for spray guns, comprising a spray gun body whose interior includes a set of fluidly connected water inlet and outlet ducts, a valve chamber for the accommodation of a control valve assembly therein, and a set of first, second, and third apertures formed therein to fluidly connect the water inlet and outlet ducts, and the valve chamber thereby wherein the control valve assembly is composed of an end cover having an accommodating cavity defining therein into which a spring, an actuating valve, a pressure valve having a valve shaft, a flexible valve having a through hole and a water-sealing portion, and a valve seat are sequentially mounted and located therein; the present invention being characterized by that, the flexible valve also having a support surface defining one side of the water-sealing portion thereon and an abutment surface with a pivoting rod disposed at the other side thereon wherein the abutment surface and the pivoting rod thereof are conjoined by a water-stop surface at the adjacent section thereon, and a water-pressure adjusting valve is provided to cooperatively work with the flexible valve thereby;

the water-pressure adjusting valve having a pressure-relief section defined by a flow orifice to be mounted to the valve shaft of the pressure valve and matched to the pivoting rod and the abutment surface of the flexible valve thereby; besides, the pressure-relief section is precisely situated between a stop seat of the spray gun body and the valve seat thereof, and a watertight ring is fixed at one side of the pressure-relief section to closely abut against the stop seat thereby; a support section is provided extending at the other side of the water-pressure adjusting valve with a pivoting hole defining the end portion in opposite to the flow orifice thereof; the pressure valve also includes a positioning ring mounted to the predetermined position of the valve shaft thereon;

therefore, the support surface and the pivoting rod of the flexible valve are respectively squeezed and pushed by the pressure valve and the positioning ring thereof so as to accurately control the flow orifice and the water-stop surface of the flexible valve closely abutted against or detached there-from for the shutoff or discharge of water supply thereby; furthermore, the water-pressure control valve can efficiently buffer the water pressure generated at the instant of water discharge via the pressure-relief section and guide the water current via the flow orifice thereof so as to maintain the balance of water pressure within the interior of the spray gun body and ensure a smooth discharge of the water supply thereby.

2. The control valve assembly for spray guns as claimed in claim 1 wherein the pressure-relief section of the water-pressure adjusting valve thereof is shaped into a plate-like configuration.

3. The control valve assembly for spray guns as claimed in claim 1 wherein the flow orifice of the water-pressure adjusting valve has a stop flange protruding at the circumferential edge of one side thereof.

4. The control valve assembly for spray guns as claimed in claim 1 wherein the water-stop surface of the flexible valve is made in an oblique-sloped shape.

5. The control valve assembly for spray guns as claimed in claim 1 wherein the pressure valve and the actuating valve are respectively equipped with a positioning stem defined by a protruding flange and an insert hole to be pivotally coupled with each other for location thereby.

6. The control valve assembly for spray guns as claimed in claim 1 wherein a collar member can be mounted between the actuating valve and the spring thereof, and the collar member is shaped in a stepwise configuration with a limiting groove defining thereon.

7. The control valve assembly for spray guns as claimed in claim 1 wherein the valve seat also includes a top-support portion extending at one end thereon, and an opening defining the center of the top-support portion therein; the other end of the valve seat is equipped with an appropriate-extending operational portion having a pivoting chamber defining therein wherein a plurality of guiding recesses each having a stop portion defining one end are annularly arranged at the pivoting chamber thereon, and oblique stepwise retaining portions are provided slanting sideways from the protrusive surface between the guiding recesses thereof.

* * * * *